(12) United States Patent
Fordemwalt et al.

(10) Patent No.: US 7,089,551 B2
(45) Date of Patent: Aug. 8, 2006

(54) SYSTEM FOR INSTALLING PERIPHERAL SOFTWARE DURING PERIPHERAL INSTALLATION

(75) Inventors: James F. Fordemwalt, Vancouver, WA (US); Shell S. Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 716 days.

(21) Appl. No.: 09/779,135

(22) Filed: Feb. 6, 2001

(65) Prior Publication Data

US 2002/0147973 A1 Oct. 10, 2002

(51) Int. Cl.
*G06F 9/45* (2006.01)
(52) U.S. Cl. .................. 717/174; 717/176; 717/177; 717/178
(58) Field of Classification Search ............... 717/170, 717/173–178; 709/220; 358/1.15, 1.14; 713/7
See application file for complete search history.

(56) References Cited

U.S. PATENT DOCUMENTS

| 5,692,111 | A  | * | 11/1997 | Marbry et al. ............. 358/1.15 |
| 5,715,463 | A  | * | 2/1998  | Merkin ........................ 717/175 |
| 6,301,012 | B1 | * | 10/2001 | White et al. ............... 358/1.15 |
| 6,424,424 | B1 | * | 7/2002  | Lomas et al. ............. 358/1.14 |
| 6,452,692 | B1 | * | 9/2002  | Yacoub ..................... 358/1.15 |
| 6,473,854 | B1 | * | 10/2002 | Fleming, III ................ 713/1 |
| 6,668,376 | B1 | * | 12/2003 | Wang et al. ................ 717/178 |
| 6,681,392 | B1 | * | 1/2004  | Henry et al. ............... 717/176 |
| 2002/0018234 | A1 | * | 2/2002  | Fu et al. ................... 358/1.15 |
| 2002/0069353 | A1 | * | 6/2002  | Smith ........................ 713/1 |
| 2002/0122199 | A1 | * | 9/2002  | Lomas et al. ............. 358/1.14 |
| 2002/0147795 | A1 | * | 10/2002 | Cantwell ................... 709/220 |
| 2002/0166045 | A1 | * | 11/2002 | Fleming, III ................ 713/1 |

OTHER PUBLICATIONS

IEEE, The authoritative dictionary of IEEE standards terms, p. 176, "client-server".*
Your dictionary.com: search results: trigger and respond.*
Webster's II New College Dictionary: terms "response" and "respond".*

* cited by examiner

*Primary Examiner*—Kakali Chaki
*Assistant Examiner*—Insun Kang

(57) ABSTRACT

A system for remote installation of software is utilized to install peripheral software associated with a device driver during the installation of the device driver for a selected peripheral. In particular, a user installs a device driver for the selected peripheral installed from a remote computer. As part of the installation process, the device driver is configured to self-initialize and invoke an initialization entry point. The initialization entry point may be configured to point to a driver initialization description file which is read by the device driver. The initialization description file includes a name of the peripheral software and an installation method for the peripheral software. This information is utilized by the device driver to install the peripheral software according to the listed installation method.

19 Claims, 5 Drawing Sheets

SYSTEM FOR INSTALLING PERIPHERAL SOFTWARE DURING PERIPHERAL INSTALLATION

TECHNICAL FIELD

The invention relates to remote installation of device drivers over a network. More particularly, the invention relates to ensuring that peripheral software associated with a selected peripheral is installed during the installation of the device driver from a remote computer.

BACKGROUND ART

The use of personal computers ("PCs") or workstations has increased as the cost of PCs has dropped. With the growth of the use of PCs, there has been an increase in the number and types of peripherals, e.g., scanners, facsimiles, etc., that may be interfaced with PCs.

There has also been a corresponding increase in support from the manufacturers of operating systems for PCs. For example, in the WINDOWS™ family of operating systems from Microsoft Corporation, Redmond, Washington, WINDOWS™ supports many manufacturers and types of peripherals by providing device drivers for the supported peripherals within the operating system. In the WINDOWS™ family of operating systems, a device driver consists of one or more executable module(s) with a ".DLL" or ".DRV" file extension and any associated data files.

Device drivers provide a low-level interface to peripheral devices. Each device driver translates abstract device operations into actual device operations which are hardware-dependent and specific to the peripheral. For the peripheral to function with a PC, a user generally has to install appropriate device drivers for the connected peripheral. Typically, operating systems provide small software programs or utilities that assist in the installation of the device driver for a selected peripheral. As an example, for a user to install a supported printer, the user would execute an installation utility and provide the location of a PRODUCT.ENF file. The PRODUCT.INF is an information file that represents a manufacturer's product name of the printer in some unique way. The manufacturer of the printer has also provided the operating system manufacturer the device driver for the selected printer. The installation utility reads the PRODUCT.ENF file and installs the device driver from the operating system's media.

A device driver may also be installed by using a self-contained executable file, e.g., a "SETUP.EXE" file in the WINDOWS™ family of operating systems. In the self-contained executable file technique, a manufacturer of a peripheral supplies a floppy disk or CD-ROM ("CD") disc that includes a self contained program that will install the device driver of the peripheral. The user installs the software by inserting the media (i.e., the floppy or CD) and executing the self-contained executable file directly from the media. In this case, the custom-made self-contained executable file installs the appropriate necessary files, registers the device drivers with the operating system, and other actions necessary for the device driver to function correctly within the operating system of the PC.

The above-mentioned two techniques work well for users of PCs that may be directly connected with peripherals. In today's computing environment, networks often connect PCs with peripherals, which may complicate the installation of device drivers for the networked peripherals. For example, FIG. 5 illustrates a computer network 500 with a number of peripherals 502a . . . 502n and a number of PCs or workstations 504a . . . 504n. Each peripheral, as well as each PC, is interfaced with the network 506, which provides a communication path for each of the peripherals to communicate with each of the PCs. The network 506 also provides a communication path to a server 508 and a peripheral server 510. The server 508 may be configured to provide access to application software and/or data to the users of the PCs 504a. . . 504n. The peripheral server 510 may be configured to provide access to the installed peripherals 512a . . . 512n for the users of the computer network 500 as well as access to application programs and/or data. Typically, for a novice user to install a device driver for one of the installed peripherals 512a . . . 512n, the novice user would have to know which device driver and where the device driver is located to interface with the selected peripheral. Unfortunately, many novice users do not possess this information readily, which may lead to frustration, confusion, and a lack of productivity for the novice user.

Recently, attempts have been made to alleviate the above difficulties of remote installation of device drivers over a network. For example, the Microsoft Corporation developed a "Point and Print" technique. The Point and Print technique is based on a remote Point and Print server, which supplies device drivers for peripherals installed on a network. Any user on the network may install a device driver for a selected peripheral by selecting an icon representing that peripheral. Alternatively, a user may install a selected peripheral for the remote Point and Print Server by supplying a shared file to a built-in peripheral installer associated with the operating system of the PC. The device driver is then copied to and installed on the user's PC.

Although the Point and Print technique may ease the difficulty for the remote installation of device drivers, the Point and Print technique may not be adequate for installing peripheral software over a network. Peripheral software is any manufacturer provided software designed to accompany a device driver for a peripheral. Peripheral software may be configured to extend the capabilities of or access to the associated device driver. For example, peripheral software may be an application for remotely managing a printer including consumables (e.g., toner, paper, etc.), an application to monitor the state of the peripheral, an application to provide Transmission Control Protocol/Internet Protocol ("TCP/IP") support for the peripheral or an application for displaying printer features to a user without requiring the user to visit a dialog box for the printer.

In the self-contained executable file or PRODUCT.INF technique, the peripheral software may be more easily installed since the manufacturer has directly supplied either the user or the operating software manufacturer with the appropriate device drivers and associated peripheral software. However, in conventional remote driver installation techniques, e.g., the Point and Print technique, procedure calls are limited to installation of the device drivers. The restriction of procedure calls consequently prevents the installation of associated peripheral software for the device driver from a remote computer. Accordingly, associated peripheral software for device drivers may not be installed using a current remote device driver installation.

SUMMARY OF INVENTION

In accordance with the principles of the present invention, a method for installing a device driver and an associated peripheral software on a client computer over a network includes invoking the device driver from a remote computer for a peripheral administrated by a remote computer over the network, and installing associated peripheral software of the peripheral in response to an initialization of the device driver by an operating system of a client computer.

One aspect of the present invention is a method for installing a device driver and an associated peripheral software that includes providing at least one peripheral installed on a remote computer, the device driver for at least one peripheral, and the associated peripheral software for at least one peripheral. The method further includes reading a description file associated with the peripheral in response to an initialization of the device driver during an installation of the device driver on a client computer, and installing the peripheral software on a client computer in response to an installation procedure of the peripheral software included in the description file.

Another aspect of the present invention is a system for remote installation of a device driver and an associated peripheral software that includes at least one processor of a client computer, a memory coupled to at least one processor of a client computer, and at least one peripheral with the device driver and the associated peripheral software installed on a remote computer. The device driver and the associated peripheral software are retrieved from the remote computer and stored in the memory and the device driver being configured to be executed by at least one processor.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

DESCRIPTION OF DRAWINGS

Features and advantages of the present invention will become apparent to those skilled in the art from the following description with reference to the drawings, in which.

DETAILED DESCRIPTION OF PREFERRED EMBODIMENTS

For simplicity and illustrative purposes, the principles of the present invention are described by referring mainly to an exemplary embodiment thereof. Although the preferred embodiment of the invention may be practiced as a software system, one of ordinary skill in the art will readily recognize that the same principles are equally applicable to, and can be implemented in, a hardware system, and that any such variation would be within such modifications that do not depart from the true spirit and scope of the present invention.

In accordance with the principles of the present invention, a remote peripheral software installer system for remote installation of software is utilized to install peripheral software associated with a device driver during the installation of the device driver for a selected peripheral. In particular, a user installs a device driver for the selected peripheral from a remote computer. As part of the installation process, the device driver is configured to self-initialize and invoke an initialization entry point. The initialization entry point may be configured to point to a driver initialization description file which is read by the device driver. The initialization description file includes the name of the peripheral software and an installation method for the peripheral software. This information is utilized by the device driver to install the peripheral software according to the listed installation method. Accordingly, by modifying the initialization entry point of the device driver, associated peripheral software may be remotely installed without a user having to be in possession of the associated peripheral software.

Figure 1:
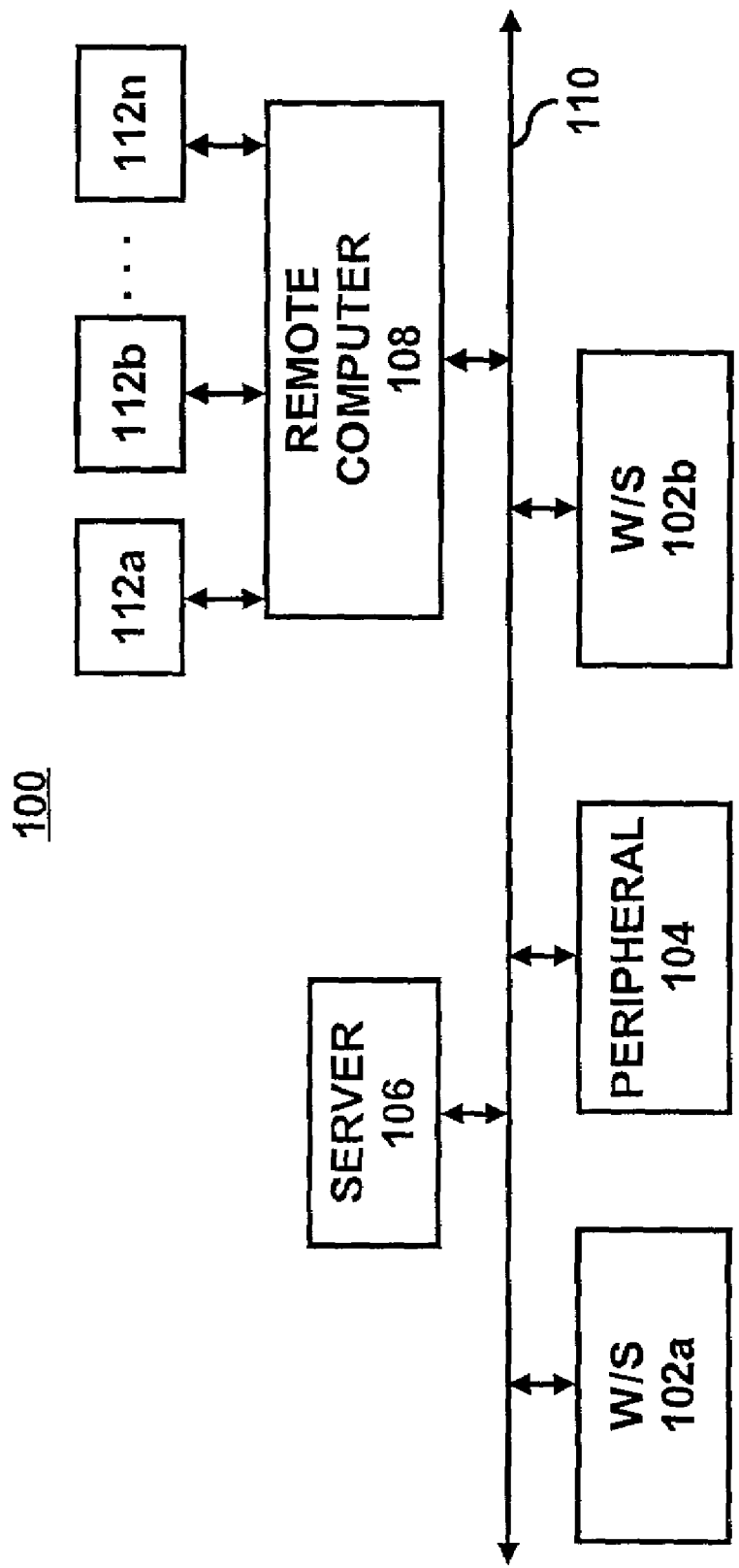
FIG. 1 illustrates a block diagram of a computer network in which an embodiment of the present invention may be implemented.

FIG. 1 illustrates a block diagram of a computer network 100 in which an embodiment of the present invention may be implemented. As shown in FIG. 1, the computer network 100 includes, for example, workstations 102a, 102b, a peripheral 104, a server 106, and a remote computer 108. Users of workstations 102a or 102b, may execute application programs and exchange data among the workstations 102a, 102b, the server 106 and/or remote computer 108 over the network 110. The peripheral 104 may be a printer, a scanner, a copier, and the like. The server 106 may be configured to provide client-server services (e.g., remote execution of application programs, data processing, etc.,) to the workstations 102a, 102b. The server 106 may be a mainframe computer, a workstation, and the like.

The remote computer 108 may be configured to administer peripherals 112a . . . 112n installed thereon by providing device drivers and associated peripheral software, access, control, and the like to the respective peripherals 112a . . . 112n. The peripherals 112a . . . 112n may be physically connected to remote computer 108. Alternatively, the peripherals 112a . . . 112n may be physically interfaced with the network 100 but logically connected to remote computer 108 to provide administrative services to the peripherals 112a . . . 112n.

Typical examples of peripherals 112a . . . 112n may be a printer, a scanner, a facsimile, plotter, and the like. The peripherals 112a . . . 112b may be installed on the remote computer 108, where the remote computer 108 may be configured to provide the device drivers and associated peripheral software to users of the computer network 100. The remote computer 108 may be a mainframe computer, a server, a workstation, or a personal computer. According to one embodiment of the present invention, a user of one of the workstations 102a, 102b may remotely install a device driver for a one or more of the peripherals 112a . . . 112n, and the associated peripheral software associated with the selected peripheral during the installation of the device driver.

Figure 2:
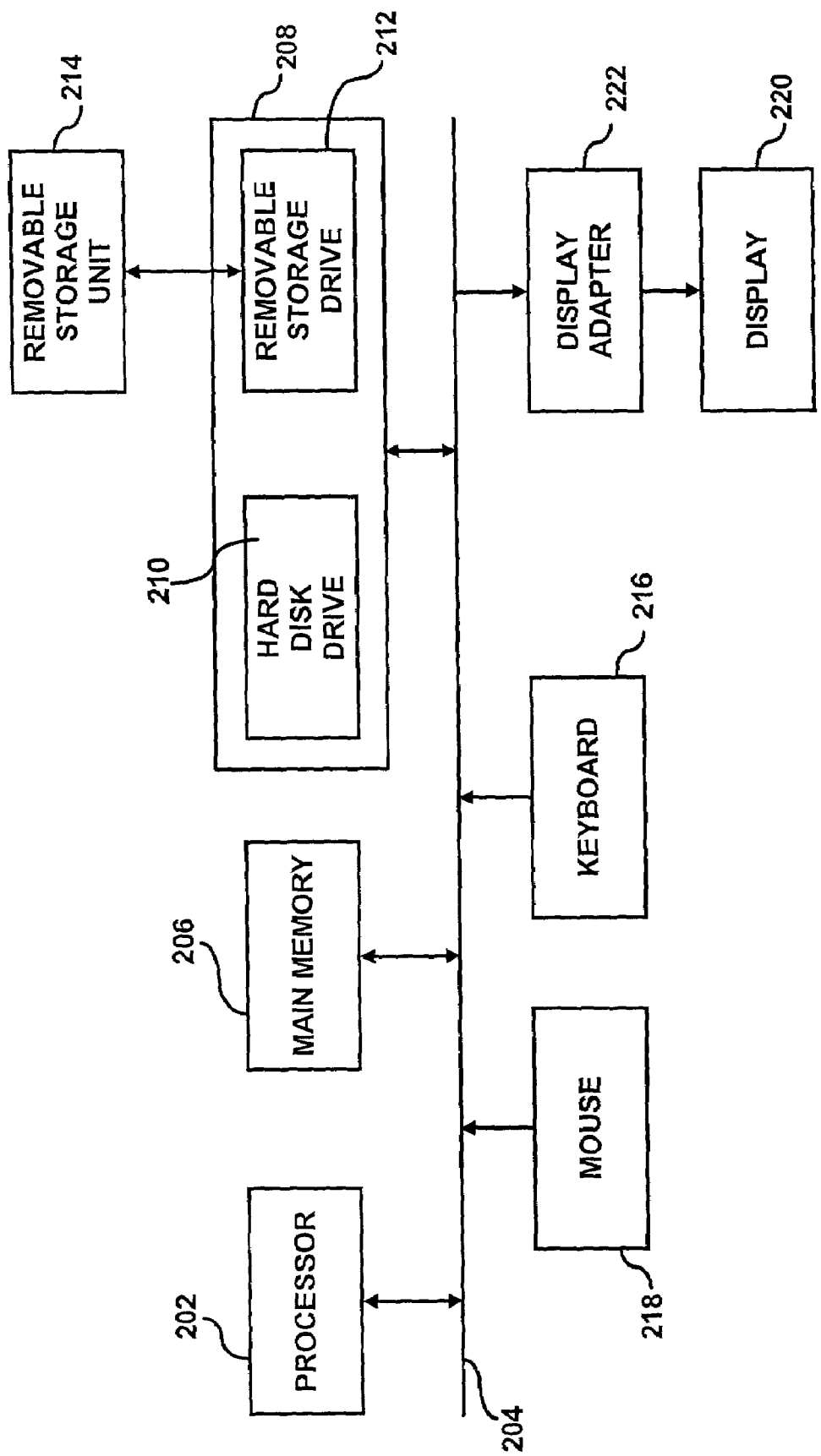
FIG. 2 illustrates an exemplary computer system in which an embodiment of the present invention may be implemented.

An exemplary computer system 200 representing any one of the workstation, 102a or 102b, is illustrated in FIG. 2. In particular, the exemplary computer system 200 includes a secondary memory 208 where an embodiment of the present invention may be stored for execution by the computer system 200. The secondary memory 208 includes, for example, a hard disk drive 210 and/or a removable storage drive 212, e.g., a floppy diskette drive, a magnetic tape drive, a compact disk drive, etc. The removable storage drive 212 reads from and/or writes to a removable storage unit 214, e.g., a floppy diskette drive, a magnetic tape drive, a compact disk drive, etc., in a well-known manner. The computer system 200 also includes a main memory 206, preferably random access memory (RAM), which may contain a computer program embodiment of the present invention for execution by the processor 202. The processor 202 communicates commands and data over the communication bus 204. A user interfaces with the computer system 200 with a keyboard 216, a mouse 218, and a display 220. The display adaptor 222 interfaces with the communication bus 204 to receive display data from the processor 202 and convert the display data into display commands to the display 220.

Figure 3:
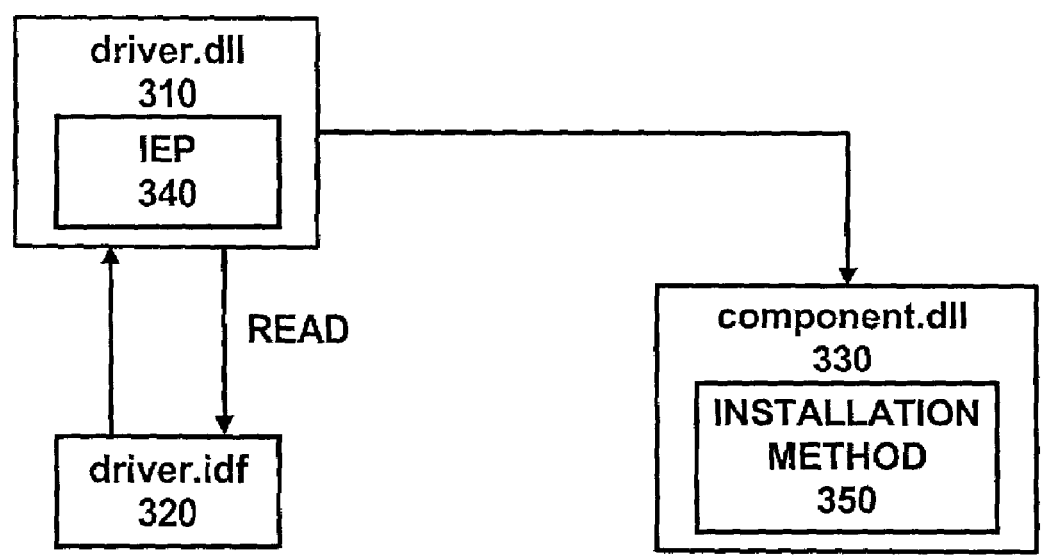
FIG. 3 illustrates a software architecture of a remote peripheral software installer according to the principles of the present invention.

FIG. 3 illustrates a software architecture 300 of a remote peripheral software installer according to the principles of the present invention. The remote peripheral software installer may be practiced with many types of peripherals, and/or device drivers and associated peripheral software for the respective peripherals. As shown in FIG. 3, the remote peripheral software installer includes a device driver, driver.dll 310 for a selected peripheral, an installation description file for the selected peripheral, driver.idf 320, and an associated peripheral software for the selected peripheral, component.dll 330.

A user of computer system 200, may begin installation of a device driver for a selected peripheral that is administered by the remote computer 108 by activating an icon that represents the selected peripheral. Alternatively, the user may supply a Universal Naming Convention ("UNC") path name of the device driver for the selected peripheral to the operating system. The operating system of the computer system 200, may begin installation of the selected peripheral by copying the driver.dll 310 for the selected peripheral to the computer system 200. Along with the driver.dll 310, the driver.idf 320 and the component.dll 330 are copied to the computer system 200 since the driver.idf 320 and the component.dll 330 are dependent or related to driver.dll 310. Once copied, driver.dll 310 may begin installation of the components of the device driver that allows the computer system 200b to interface with the selected peripheral.

As part of the installation process, the operating system of the computer system 200 may be configured to invoke a driver initialization entry point of the driver.dll 310, which in turns invokes an initialization entry point 340. The initialization entry point 340 is configured to redirect the driver.dll 310 to examine the driver.idf 320, which is configured to provide identification of the associated peripheral software, component.dll 330, for the selected peripheral and the installation method 350 for the associated peripheral software. After reading the driver.idf 320, the driver.dll 310 may be further configured to invoke the installation of the component.dll 330, according to the installation method 350 provided by the driver.idf 320.

After installation of the component.dll 330 for the selected peripheral, the driver.dll 310 returns from the initialization entry point 340 and completes the installation of the device driver as known to those skilled in the art. Accordingly, by modifying the initialization entry point of a device driver for a selected peripheral, the device driver may be redirected to install the associated peripheral software for the selected peripheral during normal remote installation of the device driver.

Figure 4:
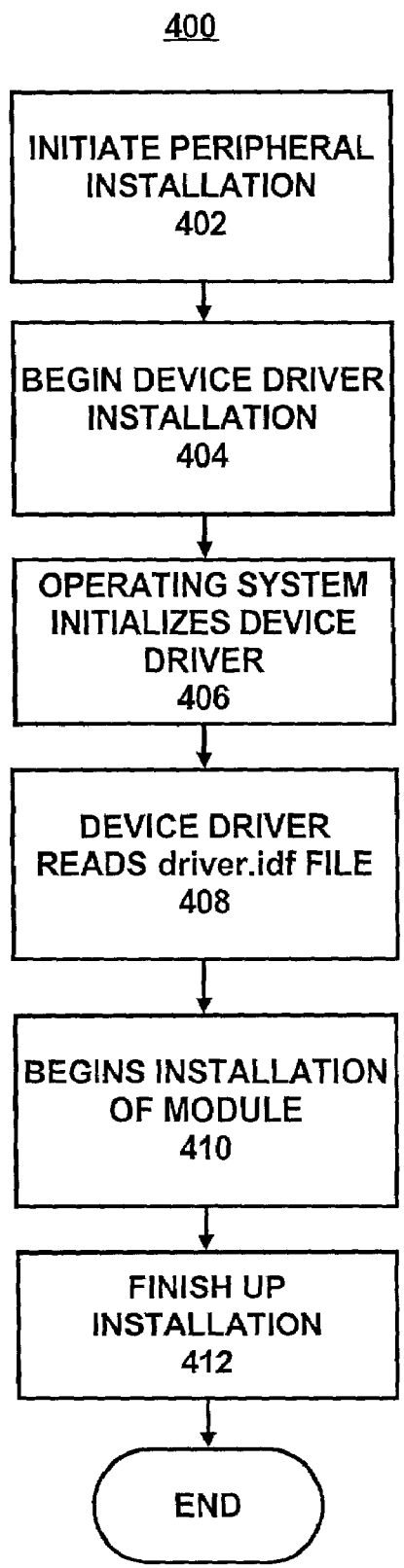
FIG. 4 illustrates a flow diagram of an embodiment of the peripheral software installer according to the principles of the present invention.
Figure 5:
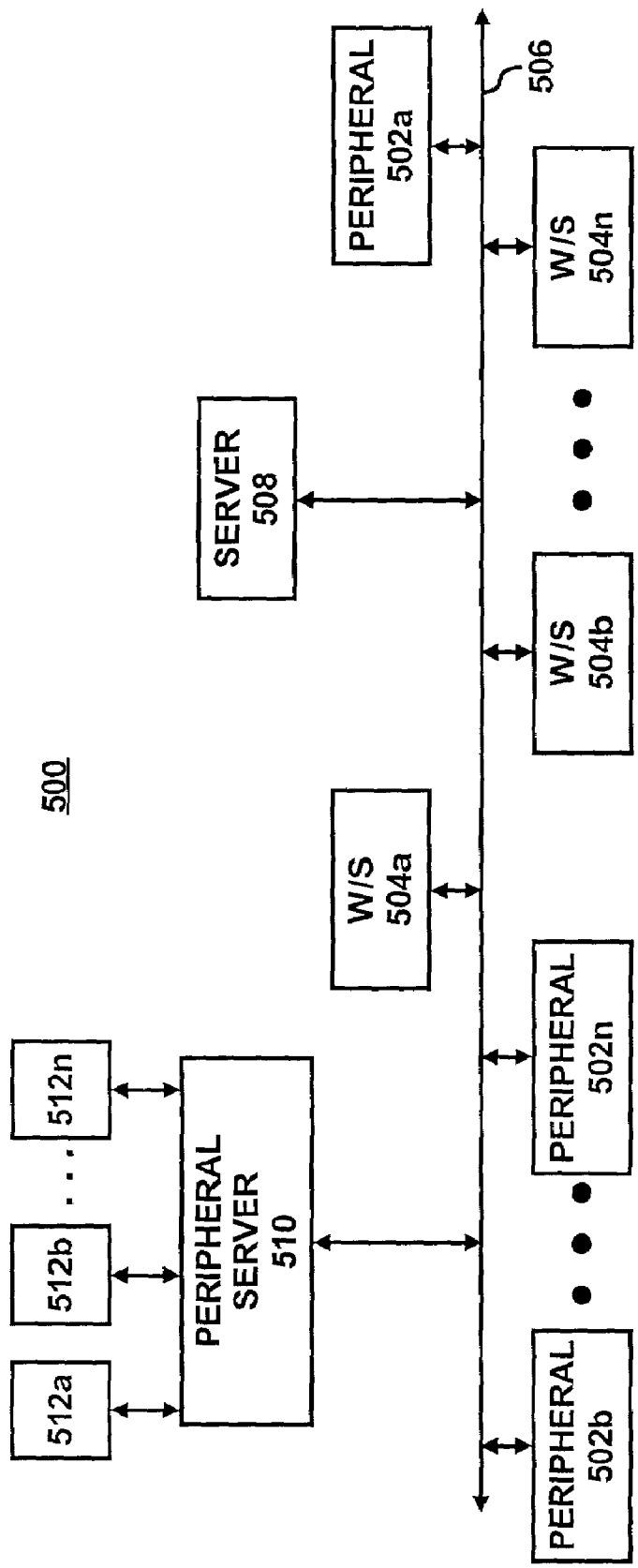
FIG. 5 illustrates a conventional network for the installation of device driver over the network.

FIG. 4 shows a flow diagram 400 for the remote peripheral software installer shown in FIG. 3, according to the principles of the present invention. In particular, in step 402, a user of one of the workstation, 102a or 102b, may install the device driver for a selected peripheral that is administered by the remote computer 108 by activating an icon that represents the selected peripheral. The device driver for the selected peripheral is represented by a file, driver.dll 310. The operating system of the one workstation, 102a or 102b, may begin installation of the selected peripheral by copying the driver.dll 310, the driver.idf 320, and the component.dll 330 for the selected peripheral, in step 404.

Once copied, the driver.dll 310 may begin installation of the components of the device driver that allows the workstation 102a or 102b to interface with the selected peripheral connected to a remote computer. As part of the installation process, the operating system of the workstation 102a or 102b may be configured to invoke a driver initialization entry point of the driver. dll 310, which in turn may be configured to invoke an initialization entry point 340, in step 406. The initialization entry point 340 is configured to redirect the driver.dll 310 to examine the driver.idf 320, which is configured to provide identification of the associated peripheral software, component.dll 330, for the selected peripheral and the installation method 350 for the associated peripheral software, in step 408. The driver.dll 310 may be farther configured to invoke the installation of the component.dll 330, according to the installation method 350 provided by the driver.idf 320 in response to an examination or reading of the driver.idf 320, in step 410. After installation of the component.dll 330 for the selected peripheral, the driver.dll 310 completes the installation of the driver.dll for the selected peripheral, in step 412.

According to the disclosed embodiment, a user of one of the workstations 102a, 102b, may remotely install a device driver for a selected peripheral of the peripherals 112a . . . 112n, in addition to remotely installing the associated peripheral software associated with the selected peripheral without any intervention by the user.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method for installing a device driver and an associated peripheral software designed to accompany the device driver on a client computer over a network, said method comprising:

invoking said device driver for a peripheral administered by a remote computer over said network;

installing said associated peripheral software of said peripheral in response to an initialization of said device driver by an operating system of said client computer; and then;

completing installation of the device driver on the client computer.

2. The method for installing a device driver and art associated peripheral software according to claim 1, further comprising:

reading an associated description file of said peripheral in response to said initialization of said device driver, said associated description file including a name of said associated peripheral software and an installation procedure; and installing said associated peripheral software according to said installation procedure on said client computer.

3. The method for installing a device driver and an associated peripheral software according to claim 1, wherein said initialization comprises an operating system call for said device driver to initialize itself.

4. The method for installing a device driver and an associated peripheral software according to claim 2, further comprising:

modifying said device driver to read said associated description file.

5. The method for installing a device driver and an associated peripheral software according to claim 1, wherein said peripheral is a printer.

6. The method for installing a device driver and an associated peripheral software according to claim 1, further comprising:

initiating installation of said peripheral by activating an icon representing said peripheral.

7. The method for installing a device driver and an associated peripheral software according to claim 1, further comprising:

initiating installation of said peripheral by selecting a UNC path name configured to represent said peripheral.

8. A method for installing a device driver and an associated peripheral software designed to accompany the device driver on a client computer over a network, comprising:

providing at least one peripheral installed on a remote computer, said device driver being for said at least one peripheral, and said associated peripheral software being for said at least one peripheral;

reading a description file associated with said at least one peripheral in response to an initialization of said device driver during an installation of said device driver on said client computer;

installing said peripheral software on said client computer in response to an installation procedure of said peripheral software included in said description file; and then;

completing installation of the device driver on the client computer.

9. The method for installing a device driver and an associated peripheral software according to claim 8, wherein said initialization comprises an operating system call for said device driver to initialize itself.

10. The method for installing a device driver and an associated peripheral software according to claim 9, further comprising:

modifying said device driver to read said description file.

11. The method for installing a device driver and an associated peripheral software according to claim 10, wherein said at least one peripheral is a printer.

12. The method for installing a device driver and an associated peripheral software according to claim 11, further comprising:

initiating installation of said at least one peripheral by activating an icon representing said at least one peripheral.

13. A system for remote installation of a device driver and an associated peripheral software designed to accompany the device driver. comprising:

at least one processor of a client computer;

a memory coupled to said at least one processor of said client computer;

at least one peripheral with said device driver and said associated peripheral software installed on a remote computer, wherein said device driver and said associated peripheral software is retrieved from said remote computer and stored in said memory, said device driver being configured to be executed by said at least one processor; and said at least one processor is further configured to read a description file identifying an installation method for said associated peripheral software in response to an initialization of said device driver during an installation of said device driver on said client computer, install said associated peripheral software according to said installation method, and then complete installation of the device driver on the client computer.

14. The system for remote installation of a device driver and an associate peripheral software according to claim 13, wherein said initialization is configured to invoke an initialization entry point configured to point to said description file.

15. The system for remote installation of a device driver and an associate peripheral software according to claim 13, wherein said at least one processor as further configured to install said associated peripheral software according to an installation procedure included in said description file.

16. The system for remote installation of a device driver and an associate peripheral software according to claim 15, wherein said initialization comprises an operating system call for said device driver to initialize itself.

17. The system for remote installation of a device driver and an assodate peripheral software according to claim 16, wherein said peripheral is a printer.

18. The system for remote installation of a device driver and an associate peripheral software according to claim 17, wherein said at least one processor is further configured to install said device driver and said associated peripheral software in response to an activation of an icon of said at least one peripheral.

19. The system for remote installation of a device driver and an associate peripheral software according to claim 16, wherein said at least one processor is further configured to install said device driver and said associated peripheral software in response to a selection of a UNC path name representing said at least one peripheral.

* * * * *

UNITED STATES PATENT AND TRADEMARK OFFICE
CERTIFICATE OF CORRECTION

PATENT NO. : 7,089,551 B2  Page 1 of 1
APPLICATION NO. : 09/779135
DATED : August 8, 2006
INVENTOR(S) : James F. Fordemwalt et al.

It is certified that error appears in the above-identified patent and that said Letters Patent is hereby corrected as shown below:

In column 1, line 40, delete "PRODUCT.ENF" and insert -- PRODUCT.INF --, therefor.

In column 1, line 46, delete "PRODUCT.ENF" and insert -- PRODUCT.INF --, therefor.

In column 6, line 22, delete "farther" and insert -- further --, therefor.

In column 6, line 63, in Claim 2, delete "art" and insert -- an --, therefor.

In column 8, line 6, in Claim 13, delete "driver." and insert -- driver, --, therefor.

In column 8, line 34, in Claim 15, delete "as" and insert -- is --, therefor.

In column 8, line 42, in Claim 17, delete "assodate" and insert -- associate --, therefor.

Signed and Sealed this

Tenth Day of February, 2009

JOHN DOLL
*Acting Director of the United States Patent and Trademark Office*